United States Patent [19]

Muirhead

[11] Patent Number: 5,420,831
[45] Date of Patent: May 30, 1995

[54] COHO DEVICE FOR IMPROVING TIME MEASUREMENT RESOLUTION

[75] Inventor: James O. Muirhead, Torrance, Calif.

[73] Assignee: Hughes Aircraft Company, Los Angeles, Calif.

[21] Appl. No.: 206,238

[22] Filed: Mar. 4, 1994

Related U.S. Application Data

[63] Continuation of Ser. No. 864,831, Apr. 7, 1992, abandoned.

[51] Int. Cl.6 .......................... G04F 8/00; G04F 10/00
[52] U.S. Cl. ........................................ 368/120; 368/47
[58] Field of Search ............................. 368/113–120; 324/83 R; 364/569, 575; 377/16, 19, 20

[56] References Cited

U.S. PATENT DOCUMENTS

| | | | |
|---|---|---|---|
| 2,442,692 | 6/1948 | Holst et al. | 368/119 |
| 2,689,346 | 9/1954 | Pierce et al. | 368/119 |
| 4,525,685 | 6/1985 | Hesselberth et al. | 331/10 |
| 4,569,598 | 2/1986 | Jacobs | 368/47 |
| 4,607,257 | 8/1986 | Noguchi | 340/825.69 |
| 4,699,508 | 10/1987 | Bolkow et al. | 356/5 |
| 5,263,012 | 11/1993 | Muirhead | 368/119 |

Primary Examiner—Bernard Roskoski
Attorney, Agent, or Firm—W. K. Denson-Low

[57] ABSTRACT

A time code receiver 18 is used to provide a rough estimate of an elapsed time, which is then enhanced by additional circuitry 53. The time code receiver 18 uses a square wave reference oscillator to produce a digital time value 56. This reference oscillator is also fed into a phase detection circuit 34 along with an output 30 from a second oscillator circuit which is triggered upon detection of the occurrence of the event 24. The measured phase difference of the time code receiver reference oscillator 20 and the second oscillator signal 30 is used to produce digital values 38 and 40 that represent a fraction of the clock cycle. This fractional clock cycle or "fine time" value is added to digital time value 56 from the time code receiver 18 to increase the resolution of time measurement. This method of measuring times of events can be used to measure events such as the arrival of radio frequency signals at remotely based receivers in order to determine the distance of the transmitter from the receivers.

10 Claims, 4 Drawing Sheets

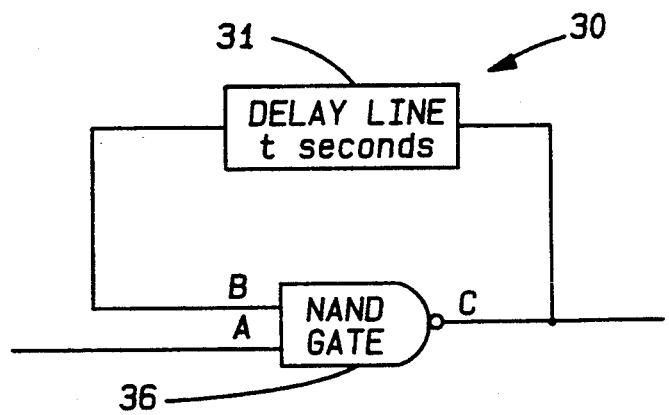
Fig-2A
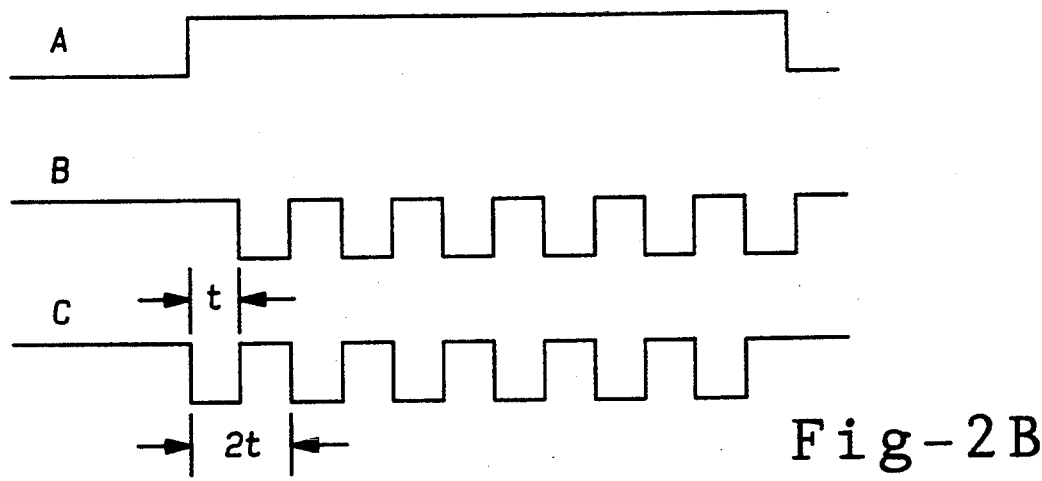
Fig-2B
Fig-2C
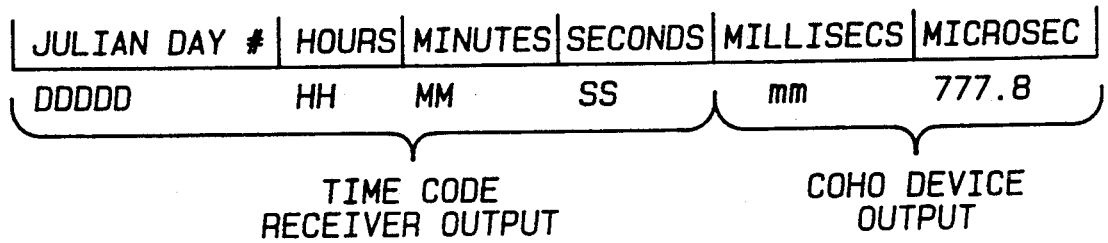
Fig-4

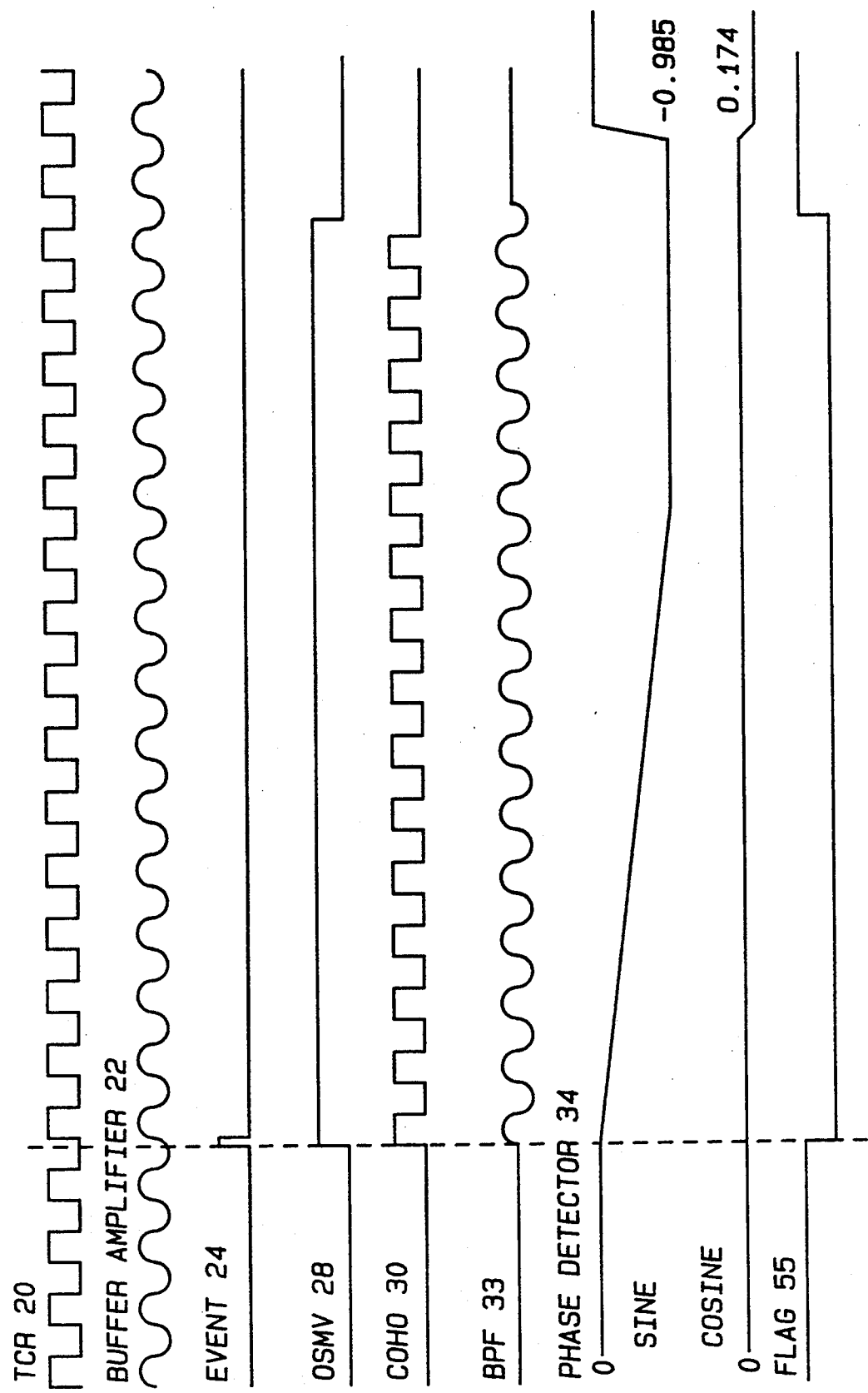

COHO DEVICE FOR IMPROVING TIME MEASUREMENT RESOLUTION

This is a continuation of application Ser. No. 864,831, filed Apr. 7, 1992, abandoned.

BACKGROUND OF THE INVENTION

1. Technical Field

This invention relates to digital timing circuits and, more particularly, to devices for making real-time measurements.

2. Discussion

Timing circuits are used in a variety of different applications to provide real-time measurements of events that occur in the real world. Time code receivers and time code generators use digital counters clocked by a high speed reference oscillator signal. This causes the time measurement resolution to be limited by the clock frequency of the time code receiver. Sometimes it becomes necessary or desirable to obtain real time values more accurate than the resolution of a given digital clock. Increased resolution may be obtained by employing additional high speed counters clocked by a phase lock loop oscillator (PLL) operating at a multiple of the frequency of the time code receiver (TCR) or time code generator (TCG) reference oscillator. However, the resolution of such a circuit is ultimately still limited by the time period of the highest frequency clock. Despite the long felt need, it does not appear that the prior art has proposed a solution to the problem with the simplicity and the resolution obtainable by the present invention.

SUMMARY OF THE INVENTION

In accordance with the teachings of the present invention, a time code receiver is used to generate a first digital output signal to provide a rough estimation of time. The time code receiver utilizes a reference oscillator which is coupled to a time resolution enhancer circuit. The enhancer circuit generates a fine time signal as a function of the phase difference between the reference oscillator signal and a second signal generated at the beginning of the event. The fine time signal has a higher resolution than the digital output signal of the time code receiver. A processor utilizes the outputs from the time code receiver and fine time signal to provide an accurate representation of the time of the event.

BRIEF DESCRIPTION OF THE DRAWINGS

The various advantages of the present invention will become apparent to those skilled in the art after a study of the specification and by reference to the drawings in which:

FIGS. 2A–2C are diagrams helpful in understanding the operation of the coherent oscillator (COHO) used in the time resolution enhancer circuit;

FIG. 3 are wave form diagrams of signals generated by the circuitry of this invention;

FIG. 4 graphically illustrates the resolution enhancement provided by way of the present invention;

DESCRIPTION OF THE PREFERRED EMBODIMENTS

It should be understood from the onset that the present invention will be described in connection with a few limited examples which illustrate the best mode of practicing the invention at the time that this application was filed. However, various modifications will become apparent to those skilled in the art after having the benefit of studying the text, drawings and claims which follow this detailed specification. With that in mind, the attention of the reader should now be turned to the drawings, especially FIG. 1.

Figure 1:
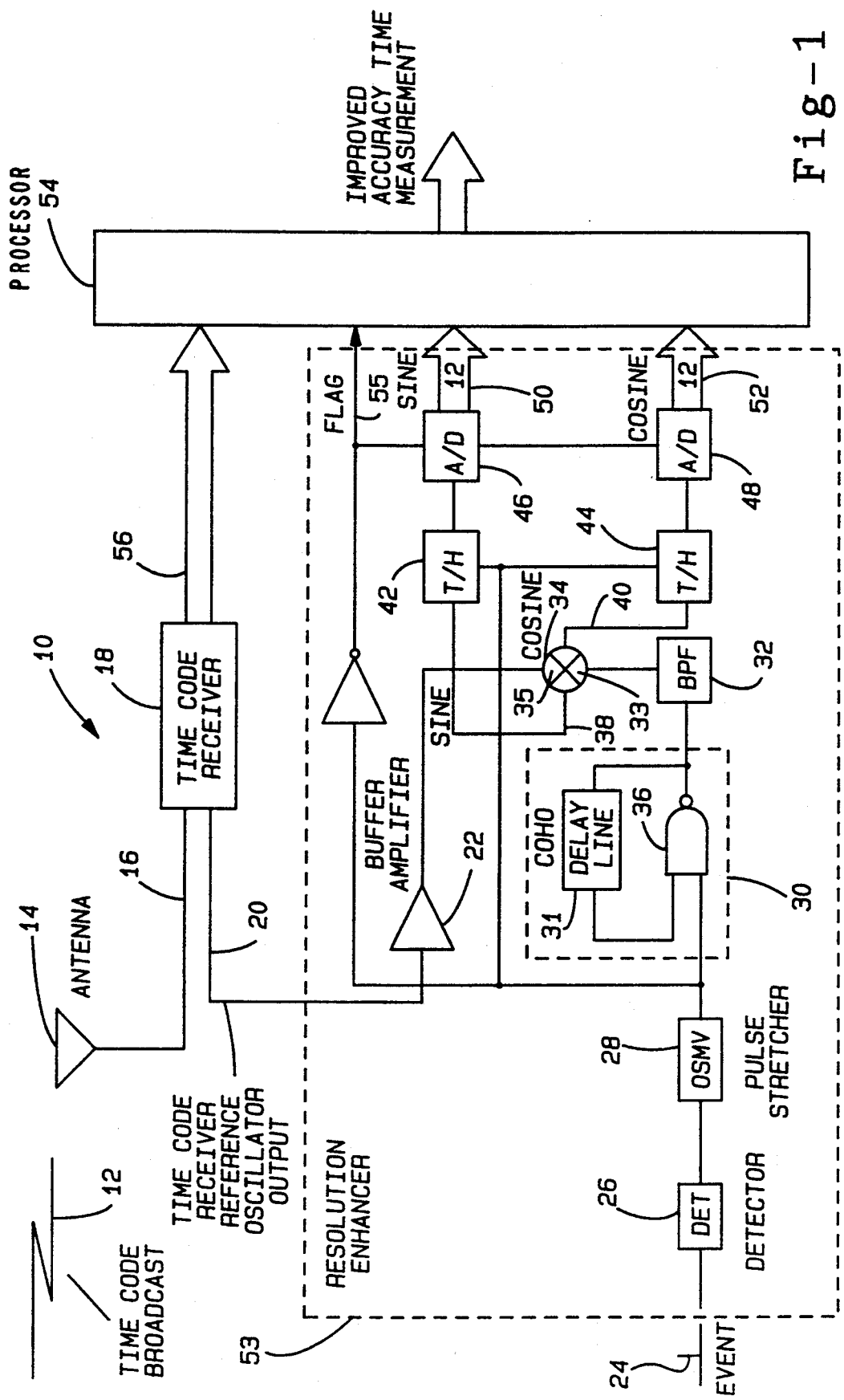
FIG. 1 is a block diagram of the system of the preferred embodiment of this invention.

FIG. 1 illustrates a system 10 embodying this invention. In accordance with the preferred teachings of this invention, a time code broadcast signal 12 is received by antenna 14 and fed to input 16 of a time code receiver 18. Time code receiver 18 is a device well known in the art that includes an internal reference oscillator (not shown) that provides a square wave output as well as a digital time code output signal associated with time. The time code receiver 18 has a reference oscillator output 20 that is fed to the buffer amplifier 22 in time resolution enhancer circuit 53 though line 24. Buffer amplifier 22 takes the square wave input and converts it to a smooth sinusoidal output. This sinewave is fed to input 35 of a phase detector 34.

The end occurrence of the event being measured is represented by signal 24. The signal 24 may be a burst of RF energy occurring at a time to be measured. When input signal 24 arrives at detector circuit 26, the signal is converted to a digital output signal. The digital output signal from detector 26 is in turn is connected to a one shot multi-vibrator (OSMV) 28 which generates a pulse of a given length. The output of the OSMV 28 is then coupled to a coherent oscillator 30 (COHO). COHO 30 has the same frequency as the reference oscillator output 20 but has a different phase. The phase difference is used to enhance the rough estimation of time provided by the time code receiver 18. The output of the COHO 30 is coupled to a band pass filter 32 which is coupled to input 33 of the phase detector 34. The phase detector circuit 34 produces a sine output 38 and a cosine output 40. These signals are fed to track and hold circuits 42 and 44. The output of the OSMV 28 is also coupled to the track and hold circuits 42 and 44 to control the switching of the track and hold circuits between track and hold modes of operation. Track and hold circuits 42 and 44 are respectively coupled to analog-to-digital converters 46 and 48.

The digital sine output 50 and the digital cosine output 52 of the enhancer circuit 53 are coupled to a digital microprocessor 54. Additionally, the digital time code output signal 56 of the time code receiver 18 is coupled to an additional input to the microprocessor 54. A flag output 55, from enhancer circuit 53, causes the microprocessor 54 to simultaneously read the digital time code output signal 56 from the TCR 18, as well as the sine 50 and cosine 52 signals from the enhancer circuit 53. The sine and cosine are interpreted as the time elapsed since the last leading edge (delta t) of the reference oscillator signal on line 20. The microprocessor 54 then outputs an enhanced digital time (time code+delta t); where time code=time code from TCR 18, and delta t=fine time from enhancer circuit 53.

The system 10 uses a coherent delay line oscillator (COHO) for simplicity, although any oscillator which starts at zero degrees on the leading edge of the input should work. The maximum time difference that can be measured is equal to or less than the period of the oscillators. FIGS. 2A–2C shows the function of the COHO 30. The input B to the NAND gate follows the NAND gate output C after the delay time t determined by the design of the delay line 31. The value t determines at what frequency the COHO will oscillate. When input A is in the low or zero state, the output C is in a high or one state and input B is a one. Whenever A becomes one, C will go to the zero state because both B and A are ones. After time t, the B input becomes zero and C becomes one. Then, after time t, B becomes one and C becomes zero again. So long as A remains high, C will oscillate between the one and the zero state with a period of 2t. The output C is inverted before leaving the COHO 30 to provide an output that starts with a one. The output C will always start synchronously (coherently) with the input A, thus the name COHerent Oscillator is derived. It should be understood that since COHO 30 always starts on a digital one, accurate phase measurements between the COHO output and the time code receiver reference oscillator signal 20 are possible.

Referring again to FIG. 1, when a time code broadcast signal 12 is received by antenna 14 and fed to input 16 of the time code receiver 18, the time code receiver 18 decodes the digital time code and feeds this number via output 56 to the microprocessor 54. The digital time code output 56 of the TCR 18 is a running clock that is constantly changing. The microprocessor 54 reads this time on the leading edge of the event 24, which is triggered by flag 55.

The square wave reference oscillator output 20 of TCR 18 is a modulated subcarrier signal from the time code broadcast 12. Buffer amplifier 22 takes the square wave reference oscillator and converts it to a smooth. sinusoidal output by removing the harmonics present. This sinewave is then fed to input 35 of the phase detector 34 which analyzes the phase of the sinewave in comparison to the phase of the wave form derived at input 33.

When the leading edge of input event signal 24 arrives at the input to the detector circuit 26, the detector circuit 26 generates a digital output signal that causes the one shot multi-vibrator 28 (OSMV) to go high. The OSMV 28 is high for a short period in which the COHO 30 produces a square wave output. Once the OSMV returns low, the COHO 30 stops producing an output. The output of the COHO 30 is band pass filtered by filter 32 to remove the harmonics. The filtered signal is then input to the phase detector 34. If another type of oscillator is used that is already a sinewave, it is not necessary to filter out the harmonics and the band pass filter 32 can be removed from the system 10.

The phase detector circuit 34 produces a sine output 38 and a cosine output 40 that are direct current signals representing the mathematical sine and cosine of the phase difference between the reference oscillator output 20 and the COHO 30 at the time of the event. Sine output 38 is fed to the track and hold circuit 42. Similarly, cosine output 40 is fed to the track and hold circuit 44. The output of the OSMV 28 is also coupled to the track and hold circuits 42 and 44. When the OSMV is high, the track and hold circuits are in "track" mode until the OSMV goes low, then the track and hold amplifiers shift into "hold" mode. The OSMV 28 also generates a flag that triggers the analog-to-digital converters 46 and 48 to convert the analog voltages into digital numbers. The number of bits used in the analog-to-digital converters 46 and 48 depends on the accuracy and resolution required of the real time value measured.

The microprocessor 54 converts the digital representation of the sine and cosine numbers produced by the analog-to-digital converters 46 and 48 into a fine time value which is defined by the equation:

(1) fine time = radian phase angle divided by radian frequency, where the radian phase angle is derived from either the sine or the cosine using the known mathematical identity:

(2) radian phase angle = arcsine or arccosine of the sine 50 or cosine 52; and (3) radian frequency = $2(\pi)f$ where f is the reference oscillator frequency 20.

The microprocessor 54 uses either the sine or the cosine value to compute the radian phase angle and chooses the value that will provide the best resolution and accuracy for the given angle. The microprocessor 54 chooses which input to use (i.e. either sine or cosine) by using the smaller of the two values since the slope of the function is the steepest below 0.7071, thus providing the greatest accuracy. The values for both the sine and cosine are also necessary to determine the correct quadrant of the phase angle. This is done with known trigonometric identities. The microprocessor 54 computes the fine time and adds it to the digital time code output signal 56 of the time code receiver 18, thus extending the time code receiver's resolution.

It should be appreciated that since analog devices are used in the implementation of the enhancer circuitry 53, the resolution of the fine time has essentially infinite resolution. The analog-to-digital converters are the limiting factor in its output accuracy and should be chosen appropriately to suit the accuracy of the time measurement of the particular application. It should also be appreciated, since the clock of the time code receiver is divided into infinitely small portions, that the resolution of the time code receiver's square wave reference oscillator becomes less important. Additionally, if extremely accurate time measurements are desired, a proprietary time code generator/receiver could be developed with more accuracy than the current broadcasted time codes and be enhanced to even more accuracy with the COHO device.

FIG. 3 illustrates wave forms at various points in the circuit, with the reference numbers corresponding to the components in FIG. 1. Wave form 20 represents the square wave reference oscillator signal from the time code receiver 18. Pulse 24 represents the occurrence of the event. The leading edge of pulse 24 starts the OSMV 28. The wave form 30 represents the output of the coherent oscillator in FIG. 1. Wave form 33 has the same frequency and phase as wave form 30, but with the harmonics filtered out. Note that wave form 30 starts at the leading edge of event signal 24, and is the same frequency as wave form 20, with a different phase. The phase difference shown by wave form 34 represents the sine of the phase angle of wave form TCR 20 (fusing COHO 30 as a reference) at the time of the event. This is illustrated by the vertical dotted line in FIG. 3. The value is represented by the microprocessor 54 as the sine of the phase angle of wave form 20 (defined as fine time in equation 1). It should be understood that the sine of the wave form 20 phase angle at the time of the event signal 24 is what allows the present invention to enhance resolution.

A typical time code broadcast consists of a Radio Frequency carrier signal which is modulated by a subcarrier which is itself modulated by a serial time code. The serial time code modulation may be either amplitude, phase or frequency shift key modulation.

The serial time code may consist of the following fields: Julian day number, hours, minutes, seconds, utc correction and other useful data. FIG. 4 illustrates the increase in resolution the present invention will produce. The time code receiver alone is only capable of accuracy to the millisecond, while the time code receiver in conjunction with the COHO device of this resolution is capable of accuracy to the microsecond.

A useful example of a readily known Time Code Broadcast is the National Bureau of Standards WWVB time code transmission on 60 kHz from Fort Collins, Colo. WWVB transmits a continuous serial time code at a rate of one bit per second. The serial code contains Julian day number, hours, minutes and universal time code correction data. The modulation is in amplitude, consisting of a 10 dB reduction in amplitude. The completion of a time code frame marks the exact minute. And the 60 kHz carrier is counted between time code frames to resolve time below one minute.

In a time code receiver the time code is clocked into a shift register using a one hertz clock. When a full frame has been received, the time code with one minute resolution is parallel shifted into a presettable counter. The counter may have a resolution of 1/60 millisecond. Flip-flops in the counter below one minute are cleared when the parallel load of the time code occurs.

The time code receiver counts the 60 kHz carrier cycles for the next minute until another complete time code frame has been received. At that point, another parallel shift of time code into the counter occurs. If the process is essentially noise free, the parallel shift of time code from the serial shift register will occur simultaneously with the overflow of the seconds counter into the minutes register.

A high precision phase locked oscillator within the time code receiver tracks the 60 kHz carrier and maintains the accuracy of the time code receiver output whenever the signal is interfered with or lost for short periods.

Other time code broadcasts use higher frequency carriers and provide resolution to microseconds allowing even greater improvements in resolution by using the COHO device for measuring the TCR clock phase.

Figure 5:
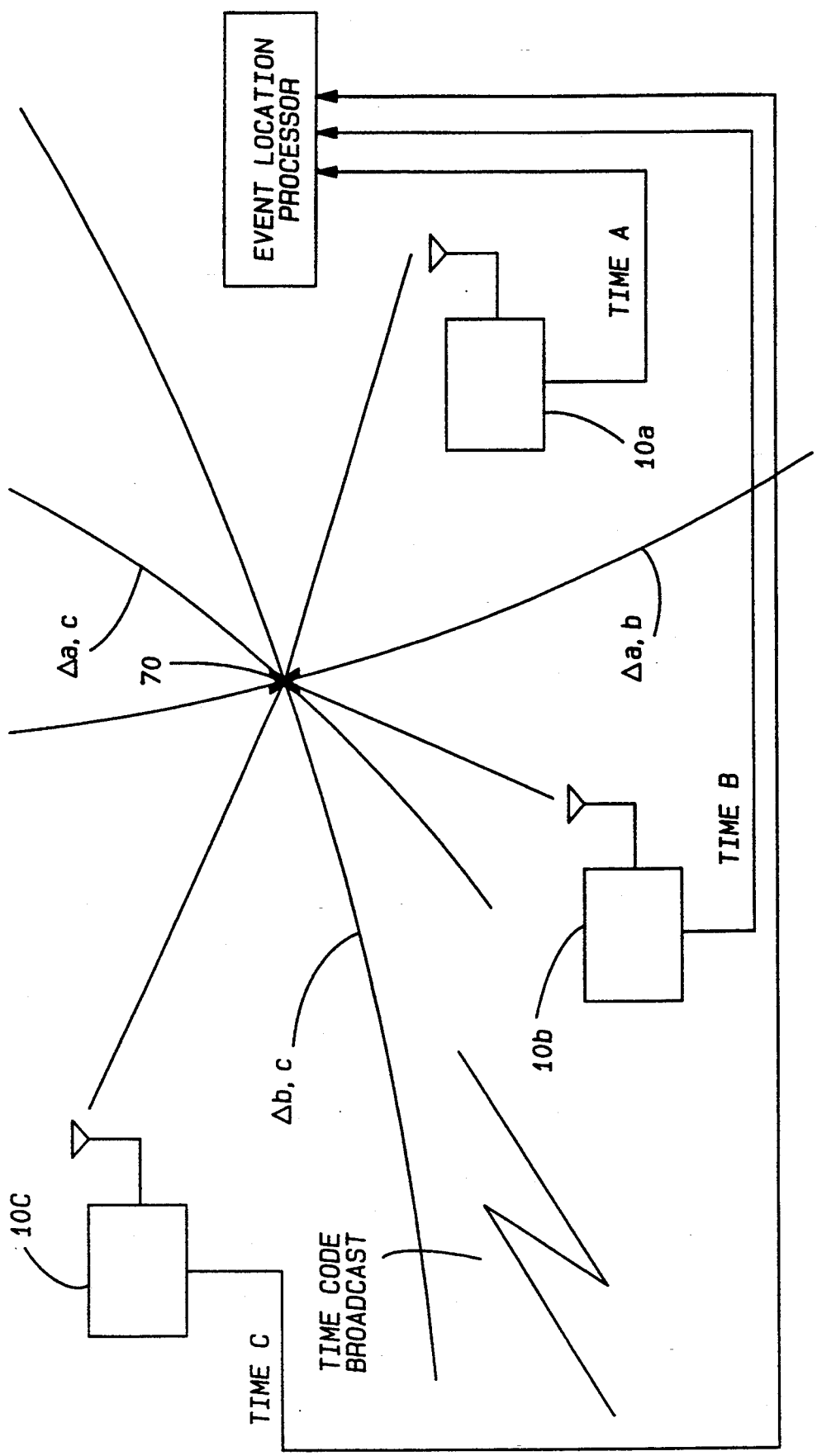
FIG. 5 diagrammatically illustrates the use of the system of the present invention for pinpointing the precise location an event occurs.

To illustrate the operation of the system, consider the example in FIG. 5 where point 70 represents the occurrence of an event. Blocks 10a, 10b, and 10c represent embodiments of the receiver systems of the current invention. When the event is detected at each of the three systems, each measures time. Since the three systems are at different, but known, physical locations being remotely based, each will measure a different time, which will enable the distance of the actual event to be calculated mathematically. This difference is known and constant, and is readily corrected for in the solution.

When the event is noted at each system, the time of arrival is recorded with great accuracy as provided by the COHO device. The times of arrival are transmitted to a processor which then determines the difference in the times at which the event signal arrived at each receiver system.

The locus of all positions with constant time difference of arrival at any pair of receiver systems describes a hyperbola. In FIG. 2, the hyperbola for the difference in the received times of event 70 between system 10a and 10b is shown as delta(a,b). The other two difference hyperbolas are denoted delta(a,c) and delta(b,c). The intersection of the hyperbolic lines of position for each system pair determines the location of event 70.

It should be appreciated, that since extremely fast clock rates are being used, and interpolated at extremely high resolutions, that the accuracy of the distances measured is extremely good.

The invention has applications in electronics support measures aboard naval ships, in tactical direction finders, and can be incorporated into electronic warfare receivers. The invention can also be incorporated into laboratory test equipment which provides improved accuracy in time measurement. When used in conjunction with emissions that emit a burst of radio frequency energy on impact, as described in pending U.S. Pat. No. 5,280,751 entitled "Radio Frequency Device For Marking Munitions Impact Point" by J. O. Muirhead et al assigned to the assignee of the present invention (which is incorporated by reference), it can used in the scoring system to locate the point of impact or in tactical systems to designate target for artillery or aircraft attack. It is understood that the above described embodiments are merely illustrative of the possible specific embodiments which may represent the principles of the present invention. Other arrangements may readily be devised in accordance with these principles by those skilled in the art without departing from the scope and spirit of the invention.

What is claimed is:

1. A circuit for determining the time of occurrence of an event, said circuit comprising:
    time code receiver means for receiving a time code signal, said time code signal having a plurality of digits including a least Significant digit, and for generating in response to said received time code signal a first digital output signal associated with time;
    said time code receiver means including means for generating a reference oscillator output signal which is synchronous with the changing of said significant digit of said time code;
    time resolution enhancer means comprising a detector for generating a second digital output signal in response to an input signal from an event, and means for generating a fine time signal indicative of a fine time value in response to the reference oscillator signal and the second digital output signal, the fine time signal having a higher resolution then the first digital output signal of the time code receiver means; and
    processor means responsive to the fine time signal and the first digital output signal for providing an accurate representation of the time of occurrence of the event as a function of the first digital output signal from the time code receiver means and the fine time signal from the time resolution enhancer means.

2. The circuit of claim 1, further comprising a multivibrator means responsive to the digital output signal for generating a pulse of a given length.

3. The circuit of claim 2, wherein the time resolution enhancer means further comprises:
    coherent oscillator (COHO) means, coupled to the multi-vibrator means, for generating a second signal at the beginning of the digital output signal, said second signal having the same frequency as the reference oscillator output signal;

said coherent oscillator starting at a known phase upon each occurrence of the digital output signal.

4. The circuit of claim 3, wherein the time resolution enhancer means further comprises:

phase detector means having first and second inputs, said first input being coupled to the output of the COHO means and the second input receiving said reference oscillator output signal, said phase detector means providing at least one output representing the sine of the phase difference between the reference oscillator output and the output of the COHO means.

5. The circuit of claim 4, wherein the phase detector means further generates an output signal representing the cosine of the phase difference between the reference oscillator output signal and the output signal from the COHO means.

6. The circuit of claim 5, which further comprises:

first track and hold circuit means for receiving the sine output of the phases detector;

second track and hold circuit means for receiving the cosine output of the phase detector; and said first and second track and hold circuit means being coupled to the output of the multi-vibrator means, said output of the multi-vibrator means controlling switching of the track and hold circuits from a track mode to a hold mode.

7. The circuit of claim 6, which further comprises:

first analog-to-digital convertor means coupled between the first track and hold circuit and the processor means;

second analog-to-digital convertor means coupled between the second track and hold circuit means and the processor means; and flag means, coupled to the multi-vibrator means, for generating trigger signals to the first and second analog-to-digital convertors and to the processor means whereby digital representations of the sine and cosine signal, as well as said digital output signal from the time code receiver means are input to the processor means.

8. The circuit of claim 7, wherein the processor means determines the time of the event by:

calculating the fine time value as a function of the sine and cosine signals; and adding the fine time signal to the time associated with the digital output signal from the time code receiver means.

9. The circuit of claim 1 wherein said first digital output signal comprises a running clock that is constantly changing.

10. The circuit of claim 1 wherein said time code signal is a broadcast time code signal received over a wireless link.

* * * * *